Nov. 29, 1960  W. M. BURKES, JR  2,962,051
INSULATED BLAST TUBE AND METHOD OF FORMING
Filed Feb. 27, 1959

INVENTOR.
W. M. BURKES, JR.

BY *Hudson & Young*

ATTORNEYS

United States Patent Office 2,962,051
Patented Nov. 29, 1960

2,962,051

INSULATED BLAST TUBE AND METHOD OF FORMING

William M. Burkes, Jr., McGregor, Tex., assignor to Phillips Petroleum Company, a corporation of Delaware Filed Feb. 27, 1959, Ser. No. 796,146

8 Claims. (Cl. 138—63)

This invention relates to a method of forming an insulated blast tube for use in gas generating engines such as rockets or gas turbines. In another aspect this invention relates to an insulated blast tube having multiple bends. In still another aspect it relates to a forming assembly with which an insulating liner can be molded within a casing to form a blast tube having compound bends.

Blast tubes are the connecting conduits used to conduct hot gases from a gas generating chamber to a nozzle powering a turbine or for direct thrust such as in a rocket. In some applications such a tube conducts a portion of the gas used for rocket propulsion to the driving means for auxiliary equipment such as flight control mechanisms. Often such blast tubes are required to contain multiple bends and frequently compound bends (bends in more than one plane) in order to reach the point of utilization within the compact structures of rocket motors.

A problem which has been encountered in the operation of such blast tubes is the rapid corrosion of the metal wall when it is contacted with gases under conditions of elevated temperature and pressure. It is not uncommon for such gases to reach temperatures as high as 800 to 1200 and even 1800° F. Another problem is the loss of heat from the gases being conducted through such tubes with the resultant loss of energy from the gas. This heat transfer introduces another problem in the selection of material used to construct the shell of such a tube which must have considerable strength at the elevated temperatures developed by such hot gases.

The problem of heat transfer and corrosion can be solved according to my invention by the use of an insulating lining within a relatively thin-walled shell which can be constructed from reinforced plastics or low alloy, light-weight, non-critical materials. The problem of forming such an insulating lining within the tube containing multiple or compound bends is solved by the method of my invention which comprises fitting a plurality of spiders along a flexible tube and threading a plurality of filaments snugly through eyelets provided in said spiders so that the tube and spider assembly can be inserted into a tubular casing while maintaining said filaments relatively taut, thus holding the spiders substantially normal to the flexible tube, the spiders holding the tube substantially concentric to said casing. The annular space between the tube and casing is then filled with a heat-stable, thermosetting plastic and the plastic is cured to a rigid form, thus providing an insulating lining within the casing. The flexible tube can then be withdrawn if desired. The blast tube constructed according to my invention can contain bends in more than one plane and is provided with an insulation of uniform thickness and a concentric gas passageway of uniform cross-sectional area.

It is an object of my invention to provide an improved blast tube having compound bends. Another object is to provide a method of forming a blast tube having an insulating liner of uniform thickness. Still another object is to provide a molding assembly with which a blast tube having compound bends can be insulated. Other objects, advantages and features of my invention will be apparent to those skilled in the art from the following discussion and drawings in which.

Figure 1:
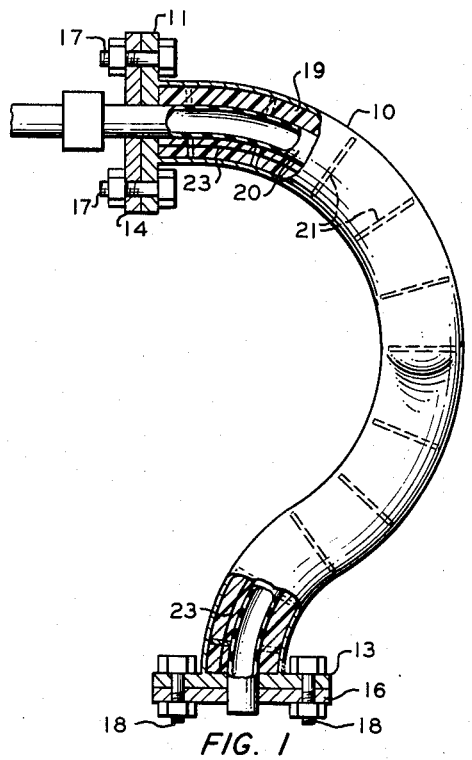
Figures 1 and 2 show the blast tube of my invention having bends in more than one plane.

The apparatus of my invention and its method of forming can best be understood by reference to the drawings. In Figure 1 a blast tube is shown having an external pressure-containing casing 10 connected to flanges 11 and 13 at its opposite ends. The blast tube as shown has been filled with the flexible tube and spider assembly and with the thermosetting resin and is fixed in position for curing. Flanges 11 and 13 are located by bolts 17 and 18 to fixed flanges 14 and 16, respectively. Flanges 14 and 16 are parts of a jig, not shown, which maintains the blast tube in proper configuration during the curing process. When the tube is installed for operation, flanges 11 and 13 are fastened to the gas generating chamber and the point of gas usage, for example, a nozzle or turbine intake. When the plastic has cured, the blast tube has an insulating liner 19 of substantial thickness with relation to the thickness of the casing 10 and the liner 19 defines a tubular passage concentrically within casing 10. While curing, liner 19 is held tightly against casing 10 by expansible tube 20, one end of which can be sealed by plugging or pinching shut and the other end connected to a source of fluid under pressure. The plurality of spacers or spiders 21 are embedded within the insulating liner 19 and preferably are formed of substantially the same material or type of material as the insulating liner. For example, if the insulating liner is formed from a phenol-formaldehyde resin filled with asbestos fibers the spiders can suitably be molded from phenol-formaldehyde resin.

Figure 2:
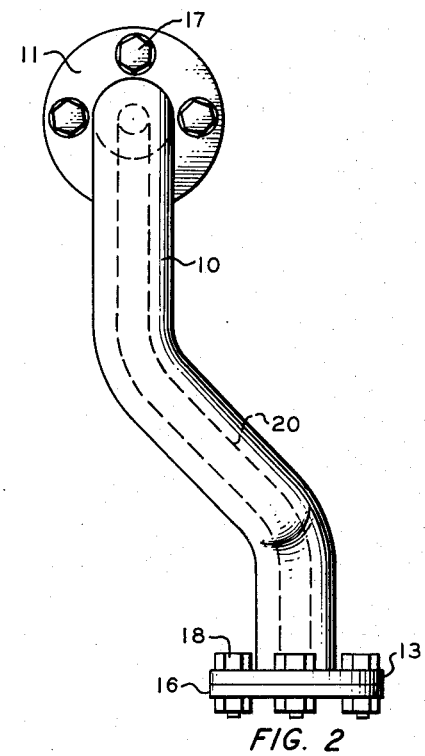

As shown in Figure 2, which is a side view of the blast tube in Figure 1, casing 10 and the insulating liner 19 contain bends in more than one plane. It would normally be quite difficult to provide casing 10 with a liner of uniform thickness and defining a concentric passageway because of the complicity of the bends in the blast tube. The method of forming a liner according to my invention, however, assures that the lining will be uniform in thickness and that the passageway will be uniform in cross section.

Figure 3:
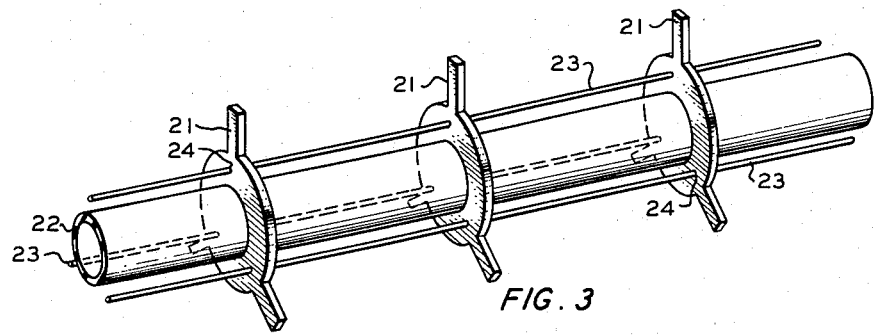
Figure 3 shows the assembly of flexible liner and spiders.
Figure 4:
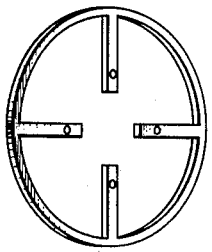
Figures 4, 5 and 6 show alternate configurations for the spiders.
Figure 5:
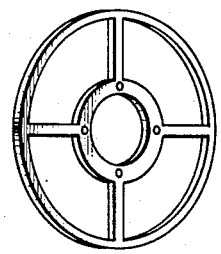
Figure 6:
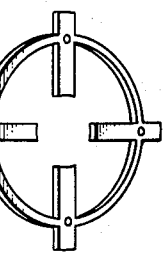

Referring to Figures 3 and 4 a plurality of spiders 21 are positioned about a flexible tubing 22 which has a diameter substantially smaller than the internal diameter of the casing. The spiders are preferably flat disk-shaped wafers having an outside diameter corresponding to the inner diameter of the casing and defining a concentric circular aperture having a diameter corresponding to the outer diameter of the flexible tube. The spider should be as open as possible and contain only sufficient bracing members to maintain rigidity and the concentric position of the flexible tube within the casing. Other possible shapes for the spiders are shown in Figures 4, 5 and 6.

The spiders are not fixed to the flexible tubing but are held in relative position and normal to the flexible tubing by a plurality of wires or filaments 23 which are passed through eyelets 24 in spiders 21. These stringer wires should fit snugly in the eyelets so that the assembly will maintain its shape when introduced into the external casing. The wires should not be securely fastened to the spiders, however, as some slippage along the wires is desirable in order that the structure can conform to the bends of the external casing as illustrated in Figures 1 and 2. Steel piano wire is suitable material for stringing the spiders, or any strong synthetic monofilament will do. A lubricant can be placed on the outer edges of the spiders or within the casing 10 to facilitate passage of the assembly into the casing. Likewise the flexible tubing or core can be coated with a mold release agent if it is desired to remove the tubing after curing the insulating liner. The number of spiders and stringer wires can vary considerably and depends to a degree upon the radii of the curves in the blast tube. The tighter the curves, the more spiders will be required to maintain the tubing concentric to the casing. At least three stringer wires should be used and four are preferred.

The flexible tube is preferably formed from an expansible material such as natural or synthetic rubber, neoprene, silicone rubbers or the like, so that it can be pressurized during the curing of the liner and thereby maintain pressure against the lining material to prevent shrinkage of this material away from the casing wall. After the flexible tubing and the assembled spiders and filaments have been introduced into the casing while holding the wires taut, an insulating compound is poured into the annular space between the tubing and casing so as to completely fill this space. The stringer wires and spiders become embedded in this compound. The insulating compound can be introduced either by injection from the bottom of the casing while venting air from the top or by sealing the bottom and pouring the compound in from the top while the casing is tilted and vibrated to prevent entrainment of air. Alternatively, the annular space between the tube and the casing can be evacuated prior to the injection of the casting compound.

The material used for the insulating compound must be heat stable. I prefer to use a phenol-formaldehyde resin filled with mineral such as asbestos or glass fibers. Other thermosetting resins such as urea-formaldehyde and melamine resins can be employed and also thermoplastic resins which have been cross-linked to render them thermally stable can be used. Examples of other plastics which are suitable are polytetrafluoroethylene, polychlorotrifluoroethylene, and fluorinated silicone rubbers. Another class of resins which are suitable are the epoxy containing polymers which are condensation products of bis-phenol A and epichlorohydrin with an epoxide equivalent weight of about 400 to 4,000, thermally cured with about 0.1 to 3 weight percent of a secondary or tertiary amine. Cement foams can be used.

After the insulating material has been introduced between the tubing and casing the casing is sealed and placed in a curing oven. During the curing period a fluid pressure can be maintained on the tubing to prevent the insulating material from separating from the casing wall. Also the casing can be rotated in the oven to prevent the filler from settling. After the cure is completed the flexible tubing can be collapsed and removed, or under some circumstances when the flexible tubing is composed of material which can withstand the temperature of the hot gases, the tubing can be left in place. For example, the tubing can be formed from polytetrafluoroethylene in which case it could be left within the casing to define the annular passage therethrough.

Our invention also lends itself quite well to another method of molding in which a flexible outer casing is used. In this embodiment the expansible tubing and spiders are inserted into the outer casing which can be, for example, a flexible or segmented metal pipe. The molding powder or fluid plastic is then introduced into the annular space between the tubing and the casing and while holding the stringer wires taut, the assembly is bent into the desired shape. The thermosetting liner is then cured to form a rigid assembly. It is frequently desirable to shape the blast tube after the core and spiders have been inserted but before the insulating lining material is introduced.

While my invention was developed specifically to solve a problem in the transfer of hot gases in rocket engines and the like, its application is not so limited. My molding technique can be used to advantage to insulate pipes carrying hot and/or corrosive fluids in apparatus other than rockets.

As will be evident to those skilled in the art, various modifications of this invention can be made, or followed, in the light of the foregoing disclosure and discussion, without departing from the spirit or scope thereof.

I claim:

1. A method of forming an insulated pipe which comprises fitting a plurality of disk shaped spiders in spaced arrangement along a flexible tube, each of said spiders being provided with a plurality of eyelets spaced in a circle about said tube, threading a plurality of filaments snugly through said eyelets so that each spider is connected to the adjacent spiders by said filaments, inserting said tube and spiders into a tubular casing having an inner diameter corresponding to the diameter of said spiders while maintaining said filaments relatively taut, said spiders being held substantially normal to said tube by said filaments and said tube being held substantially concentric to said casing by said spiders, filling the annular space between said tube and casing with thermosetting plastic, and curing said plastic to form a heat stable, insulating lining in said casing.

2. The method of claim 1 wherein said tube is expansible, fluid pressure is maintained within said tube during said curing step and thereafter said tube is collapsed and withdrawn.

3. The method of claim 1 wherein said casing is formed into its final shape before said tube and spiders are inserted therein.

4. The method of claim 1 wherein said casing is flexible, said tube and spiders are inserted therein while said casing is relatively straight and thereafter the casing and tubing are formed into the final configuration.

5. The method of claim 4 wherein said casing is formed into its final configuration after filling with thermosetting plastic and before curing the plastic.

6. A method of forming a compound bend blast tube which comprises bending a tubular casing into a configuration having at least two bends in different planes, placing a plurality of open walled circular spacers in spaced arrangement on an elastic tube substantially smaller in diameter than said casing, said spacers having a plurality of eyelets spaced evenly in a concentric circle, threading a plurality of filaments through said eyelets so that adjacent spacers are connected by said filaments which fit snugly in said eyelets, inserting said tube and spacers into said casing while keeping said filaments taut, said spacers serving to maintain said tube in concentric position within said casing, filling the annular space between said tube and casing with thermosetting insulating plastic, pressurizing the inside of said tube thereby pressing said plastic against said casing, curing said plastic, and removing said elastic tube.

7. A blast tube comprising a tubular casing having at least two bends, a concentrically disposed tubular liner within said casing and spaced therefrom, a plurality of circular spacers positioned about said liner and along the length thereof inside said casing holding said liner in concentric position, each of said spacers containing a plurality of eyelets arranged around said liner, said eyelets being aligned from one spacer to another, a plurality of wires, each of said wires being continuously threaded through the aligned eyelets in all of said spacers, and insulating material filling the annular volume between said liner and casing not occupied by said spacers.

8. A forming assembly into which insulating material can be forced to provide an insulated wall for a blast tube comprising a tubular casing having at least two bends, a concentrically disposed tubular liner within said casing and spaced therefrom, a plurality of circular spacers positioned about said liner and along the length thereof inside said casing holding said liner in concentric position, each of said spacers containing a plurality of eyelets arranged around said liner, said eyelets being aligned from one spacer to another, and a plurality of wires, each of said wires being continuously snugly threaded through the aligned eyelets in all of said spacers.

References Cited in the file of this patent

UNITED STATES PATENTS

| | | |
|---|---|---|
| 394,398 | Riley | Dec. 11, 1886 |
| 2,330,966 | Gottwald et al. | Oct. 5, 1943 |